United States Patent [19]

Langsdorf et al.

[11] Patent Number: 4,953,396
[45] Date of Patent: Sep. 4, 1990

[54] LEAK DETECTOR FOR CONTAINERS

[75] Inventors: John W. Langsdorf, Crystal; Tina O. Outlaw, Inver Grove Heights, both of Minn.

[73] Assignee: General Mills, Inc., Minneapolis, Minn.

[21] Appl. No.: 395,832

[22] Filed: Aug. 18, 1989

[51] Int. Cl.⁵ ............................................. G01M 3/32
[52] U.S. Cl. ....................................... 73/49.3; 73/45.4
[58] Field of Search ........................ 73/49.3, 45.4, 52

[56] References Cited

U.S. PATENT DOCUMENTS

| 4,148,213 | 4/1979 | Prakken | 73/45.4 |
| 4,510,730 | 4/1985 | Edmondson | 73/49.3 X |
| 4,593,554 | 6/1986 | Aarts | 73/49.3 |
| 4,689,987 | 9/1987 | Aarts | 73/49.3 |
| 4,756,184 | 7/1988 | Reishus et al. | 73/49.3 |

FOREIGN PATENT DOCUMENTS

| 1209569 | 9/1959 | France | 73/49.3 |
| 1147 | 3/1967 | Japan | 73/49.3 |

Primary Examiner—Hezron E. Williams
Assistant Examiner—Joseph W. Roskos
Attorney, Agent, or Firm—John A. O'Toole

[57] ABSTRACT

A leak detection apparatus and method provides uniform pressure application for leak testing of irregular containers. The leak detector utilizes compressed air at a regulated low pressure and includes timing and pneumatic valve components for providing a timed pressure application and release cycle and an inflatable shroud which envelopes the container and applies substantially uniform pressure thereto. Leak detection is accomplished by visual inspection of the container during and immediately after the pressure application cycle. An alternate embodiment detector provides semi-automated testing. Fill and vent valves are controlled by a microprocessor which receives data from a pressure transducer. A read only memory stores one or more selectable decay functions and the microprocessor compares the pressure decay rate of the shroud and the container under test with an appropriate stored function to determine whether the container is leaking and provides a two-state (Accept-Reject) output.

16 Claims, 2 Drawing Sheets

LEAK DETECTOR FOR CONTAINERS

BACKGROUND OF THE INVENTION

The invention relates generally to leak detection equipment and more specifically to leak detection equipment for determining the existence of leaks in irregularly shaped containers for fluids and semi-fluid substances, for example, food, and the like and a method of leak detection.

Leak detection of containers is task specific in that the test must be specialized and adapted to not only the configuration of the container but also of the product disposed therewithin. Numerous factors fall under the first consideration, such as the shape of the container, the material from which the container is fabricated and the closure of the container, including not only how the closure is sealed upon fabrication and filling of the container but also how the closure is opened. With regard to the product itself typical factors are the density of the material, the air content either within the material or remaining within the container above the product, whether the material freezes or exhibits other temperature dependent behavior, whether the material is dry, moist or liquid, and solid, viscous or fluid. Clearly, the leak detection process must respond to these and other container/closure/product considerations.

In the prior art, many disclosures relate to leak detection schemes in which pressure is applied to a flexible container to determine whether the container integrity is such that internal pressure resists the force or the container fails and collapses because of a leak. For example, U.S. Pat. No. 4,148,213 to Prakken utilizes a conveyor belt to apply force to flexible packages, senses those packages which do not resist the applied force and moves them from between the conveyor belts by an air stream. U.S. Pat. No. 4,510,730 to Edmondson compresses a flexible package between opposed pressure members and senses the degree of closure of the pressure members. Members which close about a package more than a predetermined amount indicate the presence of a non-sealed container. U.S. Pat. No. 4,756,184 to Reishus et al., owned by the assignee herein, teaches an apparatus which applies a direct compressive force to the flexible portion of a container and measures the reaction force resulting from the internal pressure within the container.

Except for the '184 patent, the foregoing equipment is intended for operation and cooperation with conventional containers having simple geometric configurations such as cylinders, cubes or rectangular solids. Pressure application to complexly configured containers poses special problems. One such container which poses leak detection challenges is a cylindrical container having a relatively small length to diameter ratio wherein the two ends are sealed along flat, linear seals oriented perpendicularly to one another. Several testing schemes have been proposed for this container which typically receives a single serving of a semi-liquid material such as yogurt, ice cream or similar foodstuff.

One proposed method involves gripping the container in the palm of the hand, squeezing and visually observing any leaks. Aside from the possible untidiness of this method, a significant difficulty is short-term and long-term repeatability. Clearly, one tester during a given production shift and even more obviously, various testers over various shifts, will find it difficult to consistently pressurize the container and provide consistent leak detection results. Secondly, the test is not adaptable to automation. Accordingly, if a large number of production samples must be tested, the method will tax a human tester.

Other methods which have been proposed contemplate placing the container in a vacuum chamber and subjecting the container to a partial vacuum to determine leaking and seal integrity. While technically a suitable test procedure, evacuation of the vacuum chamber and cleanup necessitated by containers that burst can be time consuming.

It has also been proposed to test container seals by injecting air into the container and observing leaks or bursting. This test procedure requires that a needle be inserted in the test container, a step which is in itself difficult and which may alter the outcome of the test by disturbing the container. Furthermore, the test requires the disposal of the sample even if it exhibits good seal integrity.

The foregoing review of task specific leakage detection equipment prompts the conclusion that improvements in the art of same are both possible and desirable.

SUMMARY OF THE INVENTION

The invention relates to a leak detector which provides uniform pressure application for leak testing of irregular containers. The leak detector utilizes compressed air at a regulated low pressure. Such compressed air may be supplied externally from a shop air supply or from a small internal air compressor or pump. In either case, a pressure regulator is utilized to adjust and regulate the air pressure within the range of about 0 to 400 MM Hg (0 to 7.7 p.s.i.). The detector includes a timing mechanism coupled to a three way solenoid valve which together provide a timed pressure application and release cycle. An inflatable shroud envelopes the container and applies substantially uniform pressure thereto. The shroud fills to the pressure provided by the regulator, is maintained at this pressure for a preselected interval and then the pressure is vented to atmosphere through the valve. Leak detection is accomplished by visual inspection of the container during and immediately after the pressure application cycle.

An alternate embodiment detector provides semi-automated testing. Air at a preselected, regulated pressure is provided to a fill valve which is controlled by a microprocessor. A vent valve is likewise controlled by the microprocessor. The fill valve first opens for a short interval to pressurize the shroud. A pressure transducer monitors the pressure of the shroud during a timed interval and provides a pressure signal to the microprocessor. A read only memory stores one or more selectable decay functions and the microprocessor compares the pressure decay rate of the shroud and the container under test with an appropriate stored function to determine whether the container is leaking and provide a two-state (Accept-Reject) output. The vent valve then opens to dump the air in the shroud.

DESCRIPTION OF THE PREFERRED EMBODIMENTS

Figure 1:
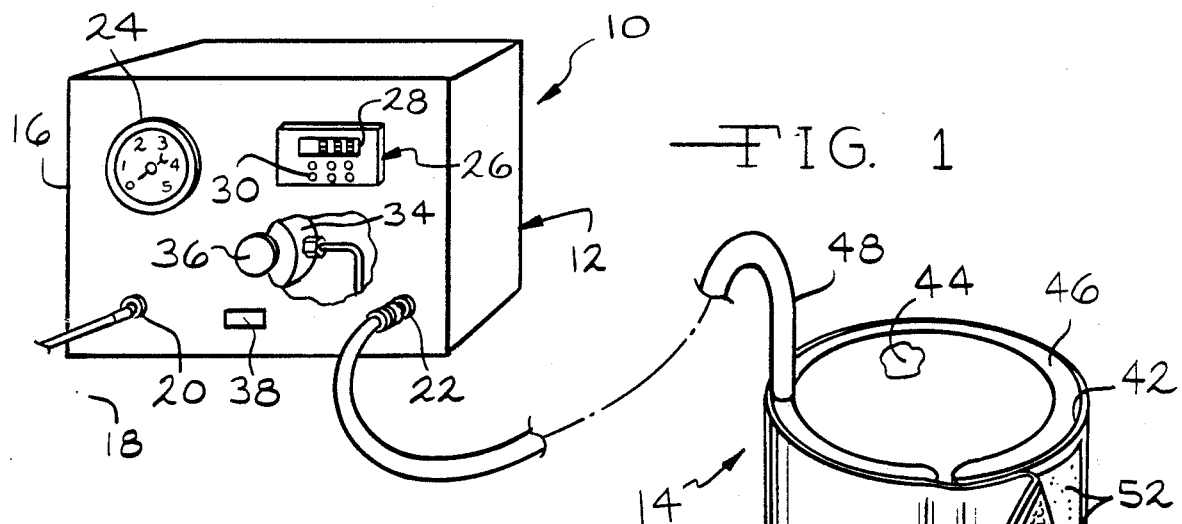
FIG. 1 is a perspective view of a leak detection apparatus according to the present invention.

Referring now to FIG. 1, a leak detection apparatus according to the instant invention is illustrated and generally designated by the reference numeral 10. The leak detection apparatus 10 includes a control assembly 12 and a pressure application assembly 14. The control assembly 12 preferably includes a housing 16 which receives and positions a compressed air input coupling 20 and a regulated air pressure output coupling 22. The input coupling 20 and the output coupling 22 may be conventional threaded, bayonet or similar type readily releasable couplings. The housing 16 also receives and supports a pressure gauge 24. The pressure gauge 24 preferably displays a pressure range of from 0 to 500 MM of Hg (0 to approximately 10 p.s.i.).

Also disposed on the housing 16 is a timer 26. The timer 26 may be either an electro-mechanical or electronic timer which in either case provides an adjustable on or activated cycle time. The timer 26 includes a display 28 which may be either analog or digital and input devices 30 such as tabs or switches to properly set, adjust and start the on cycle of the timer 28 as will be readily appreciated. The housing 16 of the control assembly 12 further includes an adjustable low pressure regulator 34 and a readily accessible adjustment knob 36 or similar component. Finally, the control assembly 12 includes an on/off switch 38 which selectively provides electrical energy to the timer 26 and other components.

The leak detection apparatus 10 also includes the pressure application assembly 14. The pressure application assembly 14 is configured like or similar to the pressure cuff of a sphygmomanometer which is commonly used to measure blood pressure. The pressure application assembly 14 includes a flexible shroud 40 which is, in fact, rectangular. In use, however, the shroud is curled or rolled into a cylinder which defines an axial length at least as long as and preferably somewhat longer than the length of a container to be tested and an internal diameter at least equivalent to the diameter of the container to be tested. The pressure application assembly 14 includes an outer shell 42 which is relatively rigid axially though relatively flexible circumferentially. The outer shell 42 supports an air chamber 44. The walls of the air chamber 44 are formed by a membrane 46 fabricated from a relatively thin-walled flexible elastomeric material such as rubber, polyvinyl chloride or the like. The membrane 46 forming the outer wall is generally coextensive with and confined by the outer shell 42. The air chamber 44 is in fluid communication with a flexible hose or supply line 48 which is in turn in fluid communication with the control assembly 12. The supply line 48 is terminated by a portion of the coupling 22. The outer shell 42 of the pressure application assembly 14 includes a releasable strap or latch 50 which may be secured to the shell 42 along one end and include either hook or loop fastener material 52 such as Velcro brand fastening material on the opposite end. The trademark Velcro is a registered trademark of the Velcro Corp. Mating material is disposed in aligned, opposed relationship on the exterior of the shell 42. The hook and loop fastener material 52 facilitates rapid and repeated closure of the shroud 40 about containers to be tested.

Figure 2A:
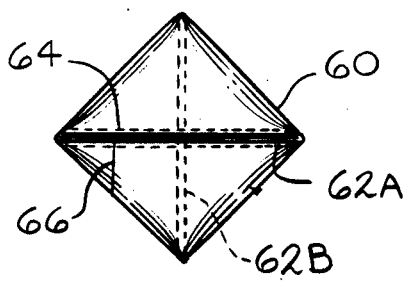
FIG. 2A and FIG. 2B are top plan and perspective views, respectively, of a cylindrical package having perpendicularly disposed end seals which may be readily leak tested with the present invention.
Figure 2B:
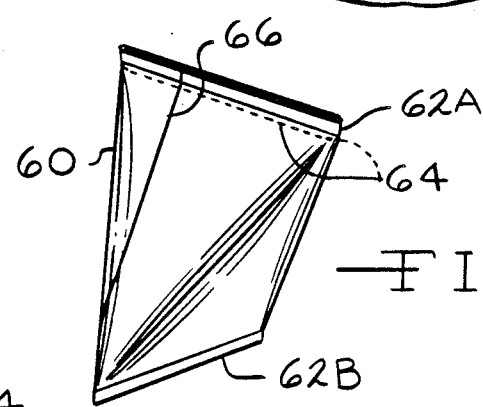

Referring now to FIGS. 2A and 2B, a typical irregularly configured container 60 which may be leak tested in the apparatus 10 of the present invention is illustrated. The container 60 is commonly known as the Tetra package or pouch. The trademark Tetra is the property of the Milliken Packaging Company of White Stone, S.C. The container 60 generally defines a pair of seals 62A and 62B oriented perpendicularly to one another. The seals are disposed at the opposite ends of the container 60 which is nominally circular but which, because of the relatively small length to diameter ratio, takes on a square appearance when viewed end-on as illustrated in FIG. 2 and a triangular appearance when viewed from the side. The container 60 may also include a semi-perforated tear line 64 which facilitates access to the contents of the container 60. A longitudinal seal line 66 is also formed by the overlapped and sealed edges of the continuous strip of material from which the container 60 is fabricated. The container 60 may typically be filled with any bulk fluid, semi-fluid or even dry material, typically foodstuffs such as ice cream, yogurt or juices. Examination of the container 60 and its complexly configured, curved exterior facilitates an understanding of the difficulty of leak detection of such a package.

It will be appreciated that while the present leak detector finds particular suitability for use in connection with the seal testing of the Tetra package illustrated, the present detector can also be used for leak detection of other complex package shapes and designs. For examples, the present detector can be used in connection with rectangular pouches of ready-to-spread frosting (e.g., 50 to 100 g.) commonly a component of dry mixes for cakes, muffins and other desserts.

Figure 3:
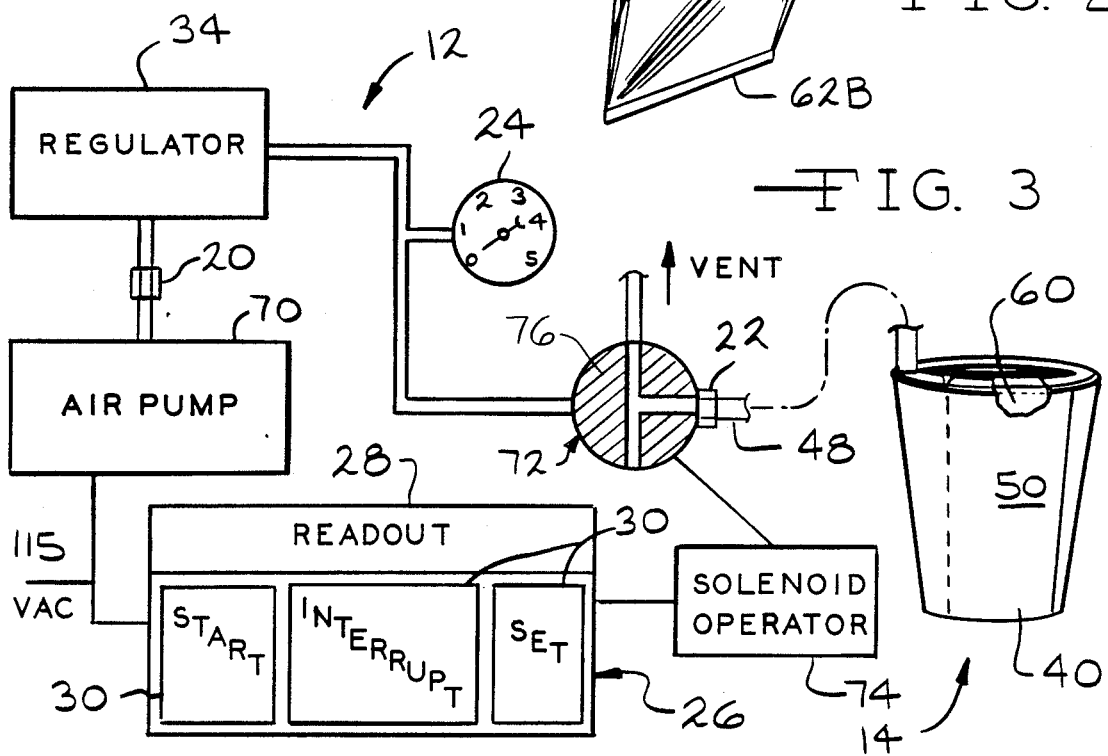
FIG. 3 is a diagrammatic view of the components of a leak detection apparatus according to the present invention.

Referring now to FIG. 3, it will be appreciated that the control assembly 12 may either receive compressed air through the line 18 and the coupling 20 or that the control assembly 12 may include its own source of compressed air such as an electrically powered air pump 70. Whether from an internal air pump 70 or an external source such as shop air, the compressed air is supplied to the regulator 34 which is adjusted to provide a flow of compressed air in the range of from 0 to about 400 MM of Hg (0 to 7.7 p.s.i.). The selected air pressure may be read and monitored upon the pressure gauge 24. Such compressed air is supplied to a electro-mechanical three-way air valve 72. The air valve 72 has two positions, fill and vent. The valve 72 is operatively connected to and controlled by a solenoid operator 74.

In FIG. 3, the air valve 72 is illustrated in the vent position. In the fill position, the solenoid operator 74 rotates a valve member 76 clockwise 90° or translates a valve spool to seal the vent port and provide compressed air through the common port of the air valve 72 to the supply line 48 and to the chamber 44 (illustrated in FIG. 1) of the shroud 40. When electrical energy is no longer supplied to the solenoid operator 74, the three-way valve 72 returns to the position illustrated in FIG. 3 and the pressurized air within the chamber 44 of the shroud 40 vents to the atmosphere. It should be understood that a pair of two way air valves (not illustrated) may readily be substituted for the three way air valve 72.

As noted previously, the cycle time of the pressurizing and leak detection operation is controlled by the timer 26. The cycle time is set by the input devices 30 on the timer 26 and may be displayed by the analog or digital readout 28. The cycle time may vary widely depending on the type of container and its contents. Generally, an appropriately accurate test may be performed in 5 to 20 seconds.

A single test cycle comprehends emplacement of the container 60 within the shroud 40 and securing the releasable latch 50 such that the container 60 is relatively securely received within the shroud 40. An appropriate cycle time such as ten seconds is entered into the timer 26 and an appropriate pressure is set by adjustment of the knob 36 of the pressure regulator 34. A typical test pressure is 300 MM Hg. Assuming appropriate electrical and pneumatic connections have been made, an input device 30 such as a start button of the timer 26 is activated and the chamber 44 of the shroud 40 is inflated for the preselected time. During the inflation cycle and directly thereafter, visual inspection is made of the container 60 to determine whether any of its contents have been forced from the container 60 by the pressure applied by the shroud 40.

Figure 4:
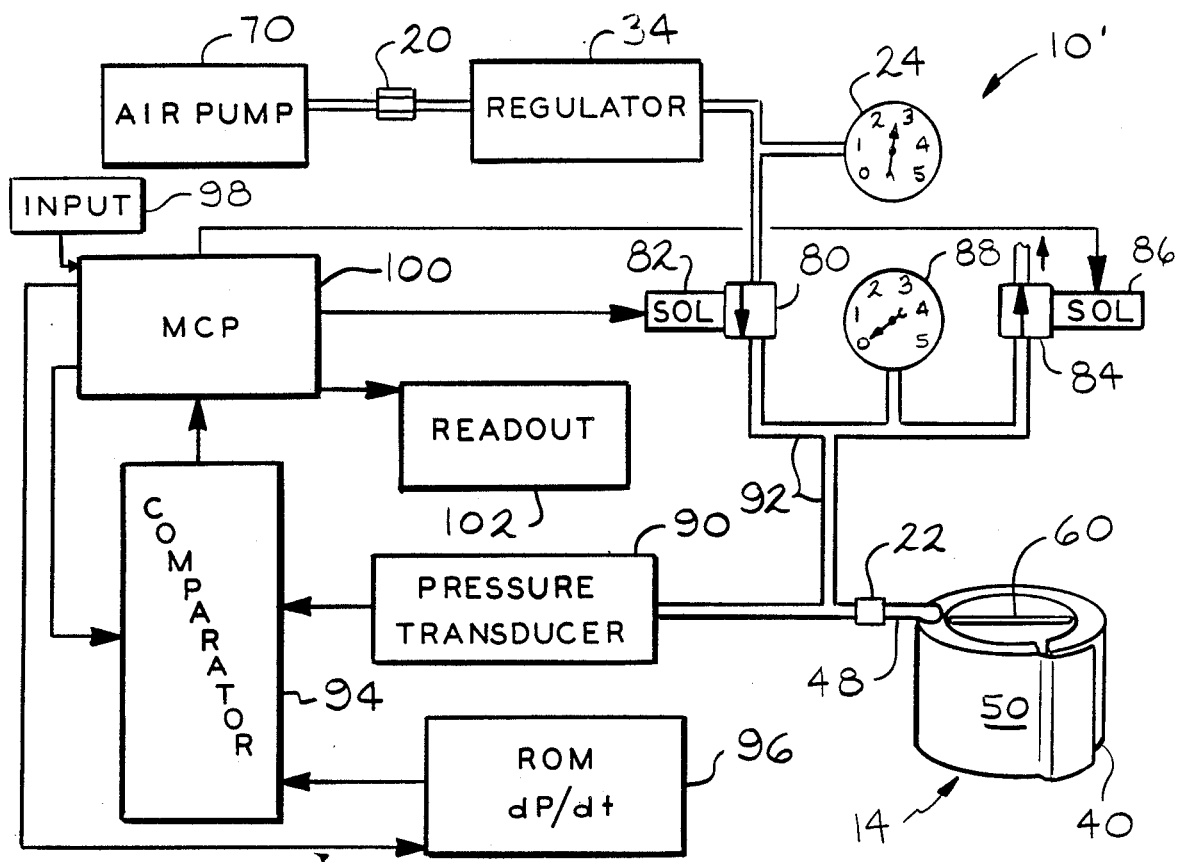
FIG. 4 is a diagrammatic view of the components of an alternate embodiment leak detection apparatus according to the present invention.

Referring now to FIG. 4, an alternate embodiment 10' of the leak detection apparatus 10 is diagrammatically illustrated. The alternate embodiment leak detection apparatus 10' comprehends many of the components of the preferred embodiment 10. For example, the air pump 70 may be utilized or an external source of compressed air such as shop air may be utilized. Likewise, the regulator 34 and pressure gauge 24 are utilized. Similarly, the pressure application assembly 14 comprising the shroud 40, the chamber 44 and the conduit or supply line 48 are also utilized. The alternate embodiment leak detection apparatus 10' includes additional readily commercially available components which provide a semi-automated testing cycle and further does not rely upon visual inspection of the container 60 to determine leakage thereof. Rather, leakage is determined by comparing the pressure decay rate of the pressurized shroud 40 over a predetermined time period.

Accordingly, the alternate embodiment leak detection apparatus 10' further includes a normally closed fill valve 80 which is controlled by a solenoid operator 82 and a normally open vent valve 84 which is controlled by a solenoid operator 86. The fill valve 80 and vent valve 84 are in fluid communication with a second pressure gauge 88 and a pressure transducer 90 through suitable fluid conduits 92. The pressure gauge 88 may be identical to the pressure gauge 34 and provides a visual indication of the pressure existing within the conduits 92 and the air chamber 44 of the shroud 40.

The pressure transducer 90 provides an electrical signal to one input of a two input comparator circuit 94. The signal may be generated by a variable resistance device such as a strain gauge excited by an external voltage or current source or may be an active signal. A second input of the comparator circuit 94 is supplied by the output of a read only memory 96 which stores one or more selectable pressure versus time (dP/dt) relationships or curves. These dP/dt curves represent maximum pressure deviation, i.e., minimum pressure versus time relationships which are the minimum acceptable pressures that must be sustained during a given pressure test. Stated differently, the curves stored in the read only memory 96 are the maximum deviations from a constant pressure that occur with a package having acceptable seal integrity. Any greater deviation indicates that the seal integrity of a given container has been lost.

A input device 98 such as a keyboard or plurality of switches facilitates selection of the operating cycle time, a dP/dt curve from the read only memory 96 and initiates a test cycle. The output of the comparator 94 is provided to a microprocessor 100. The microprocessor 100 provides operating signals to drive circuitry such as triacs (not illustrated) associated with the fill and vent solenoid operators 82 and 86, respectively. The microprocessor 100 also provides an output to a readout 102 which may indicate the acceptability or failure of a given container 60 under test as well as other data such as the number of failures, the pressure at the end of each test, etc. The microprocessor 100 also provides an output to the comparator 94 which enables or disables the comparator 94 and an output to the read only memory 96 which selects the desired time versus pressure (dP/dt) curve.

Figure 5:
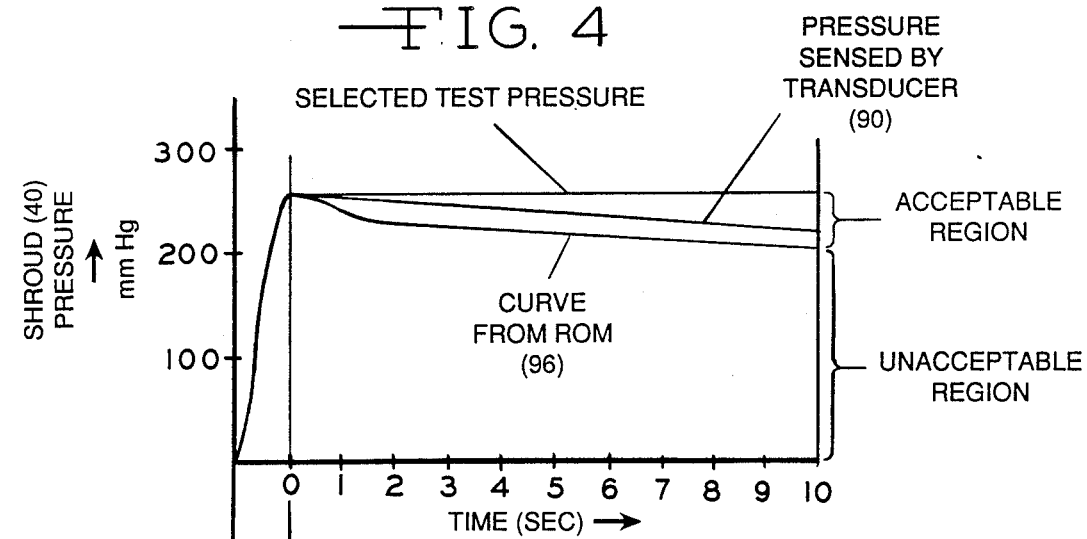
FIG. 5 is a representative pressure graph and operating sequence versus time diagram illustrating the operation of the alternate embodiment leak detection apparatus according to the present invention.
Figure 5:
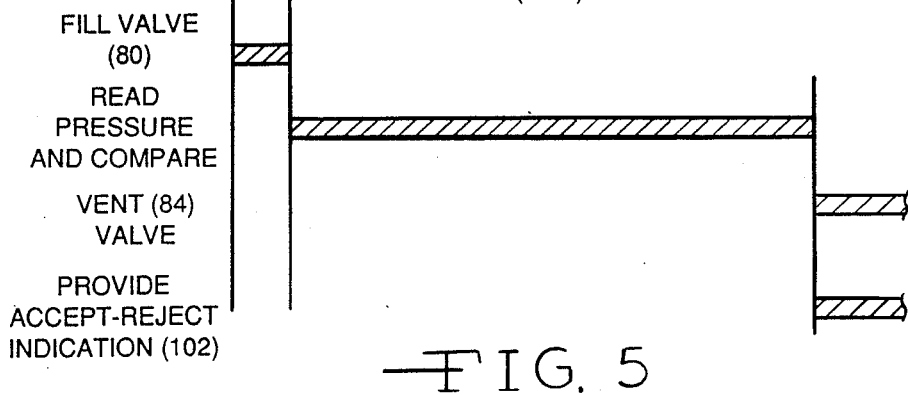

As illustrated in FIG. 5, the alternate embodiment leak detection apparatus 10' compares the pressure decay within the pressure application assembly 14 with a maximum acceptable pressure decay, i.e., minimum pressure, curve which has been stored in the read only memory 96. If the pressure within the chamber 44 of the shroud 40 as sensed by the pressure transducer 90 during or at the end of the test is below the lower limit established by the preselected decay curve, the comparator 94 provides a low (or nil) logic signal to the microprocessor 100 and the microprocessor 100 indicates that the container 60 has failed, presumably by virtue of seal failure and concomitant partial loss of contained material. A failure indication will also occur if the container 60 is insufficiently filled, i.e., includes an air pocket, since it will readily collapse. The readout 102 will indicate such a failure. Conversely, if the pressure within the chamber 44 of the shroud 40 as sensed by the pressure transducer 90 remains above the lower threshold established by the curve of the read only memory 96 during the test, the comparator 94 provides a positive or high logic signal to the microprocessor 100. The microprocessor 100 in turn provides a pass or accept indication by the readout 102.

The ten second test period presented in FIG. 5 has proved suitable from the container 60 illustrated. It should be understood that this test cycle period may be adjusted widely to suit other applications and product tests. Likewise, the shape and deviation represented by the curve from the read only memory 96 appearing in FIG. 5 is illustrative only. Accordingly, it should be understood that varied and diverse decay curves representing acceptable performance of various containers may be stored and utilized and are within the purview of this invention.

FIG. 5 also sets forth the operating sequence of the alternate embodiment leak detection apparatus 10'. After placing the container 60 to be tested in the shroud 40, the test pressure is selected by adjusting the knob 36 on the regulator 34. Next, the input device 98 is utilized to select the proper and desired decay curve from the read only memory 96. A start signal is provided by the input device 98 to the microprocessor 100 and the test cycle begins by providing signals which open the fill valve 80 and close the vent valve 84. After a suitable interval, the fill valve 80 is also closed and the microprocessor 100 enables the comparator 94 and the read only memory 96 and the leak test begins. The microprocessor may be configured in one of two modes. In one mode, at any time during the leak test if the pressure sensed by the transducer 90 drops below the decay curve provided by the read only memory 96, the test terminates and a reject message is provided in the readout 102. In the second mode, only the condition at the end of the test is utilized to provide and accept/reject message in readout 102. That is, although the pressure sensed by the pressure transducer 90 may momentarily fall below the curve provided by the read only memory 96, a reject message will be presented only if the sensed pressure is below the curve at the conclusion of the test cycle. At the end of the test cycle, the vent valve 84 will be opened by the microprocessor 100 and an accept or a reject message will be displayed on the readout 102 in accordance with the test finding.

The foregoing disclosure is the best mode devised by the inventors for practicing this invention. It is apparent, however, that devices incorporating modifications and variations will be obvious to one skilled in the art of leak detection. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A leak detection apparatus for a container comprising, in combination,
    regulator means for providing air at a pressure of less than about 500 mm Hg,
    timing means for providing an adjustable cycle time,
    a valve means having an inlet port in fluid communication with said regulator means for providing air, a vent port to atmosphere, a common port outlet and an operator coupled to said timing means for alternately and exclusively placing said common port in fluid communication with said inlet and said vent, and
    a shroud for receiving a container to be tested, said shroud including releasable means for securing said shroud about said container, at least one inflatable air chamber and means for providing fluid communication between said air chamber and said outlet of said valve means.

2. The leak detection apparatus of claim 1 wherein said cycle time is adjustable between at least 5 seconds and 20 seconds.

3. The leak detection apparatus of claim 1 wherein said cycle time is 10 seconds.

4. The leak detection apparatus of claim 1 wherein said regulator means is a manually adjustable mechanical fluid regulator having a range of from 0 to about 500 mm Hg.

5. The leak detection apparatus of claim 1 wherein said shroud is rectangular in configuration.

6. The leak detection apparatus of claim 1 further including a pressure gauge in fluid communication with said air chamber.

7. The leak detection apparatus of claim 1 wherein said releasable means includes mating hook and loop fasteners.

8. The leak detection apparatus of claim 1 wherein said timing means includes means for setting a desired time interval and means for providing an output to said valve means for actuating said valve means.

9. The leak detection apparatus of claim 1 wherein said valve means is a three way valve having a common port in fluid communication with said shroud and an inlet port in fluid communication with said regulator means and an outlet port in fluid communication to the atmosphere.

10. A leak detection apparatus for a container comprising, in combination,
    regulator means for providing air at an adjustable pressure of less than about 500 mm Hg,
    a shroud for receiving a container to be tested, said shroud including releasable means for securing said shroud about a container, at least one inflatable air chamber and means for providing regulated pressure air to said chamber,
    valve means in fluid communication with said chamber through said means for providing regulated pressure air for selectively coupling said chamber to said regulator means, coupling said chamber to the atmosphere or sealing off said chamber,
    control means including a data input device, a decay curve generator providing a decay signal, a pressure transducer in fluid communication with said chamber and having a pressure output signal, a comparator having inputs for said decay and said pressure signals and an output, a readout and a microprocessor for accepting signals from said data input device and said comparator output and providing signals to said decay curve generator, said readout and said valve means.

11. The leak detection apparatus of claim 10 wherein said regulator means is a manually adjustable mechanical fluid regulator having a range of from 0 to about 500 mm Hg.

12. The lead detection apparatus of claim 10 wherein said shroud is rectangular in configuration.

13. The leak detection apparatus of claim 10 further including a pressure gauge in fluid communication with said air chamber.

14. The lead detection apparatus of claim 10 wherein said releasable means includes mating hook and loop fasteners.

15. The lead detection apparatus of claim 10 wherein said valve means includes a first, normally open valve and a second, normally closed valve.

16. The leak detection apparatus of claim 10 wherein said microprocessor includes cycle timing means adjustable between at least 5 and 20 seconds.

* * * * *